Nov. 25, 1941.  D. JORGENSEN  2,263,879

HAND TRUCK

Filed March 21, 1940

Delbert Jorgensen
INVENTOR.

BY *CAKnowles*
ATTORNEYS.

Patented Nov. 25, 1941

2,263,879

UNITED STATES PATENT OFFICE 2,263,879

HAND TRUCK

Delbert Jorgensen, Fremont, Nebr.

Application March 21, 1940, Serial No. 325,255

2 Claims. (Cl. 280—53)

This invention aims to provide a novel vehicle of the barrow or hand truck type, so constructed that it may be rolled on its wheels, along an approximately horizontal surface, or be slid downstairs or upstairs, without bumping, it being possible, thus, to handle merchandise readily, without unloading it, when it is desired to transport the merchandise from one floor to another. The invention aims to improve the frame and skid construction, and, generally, to improve and to enhance the utility of devices of the sort under consideration.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 2:
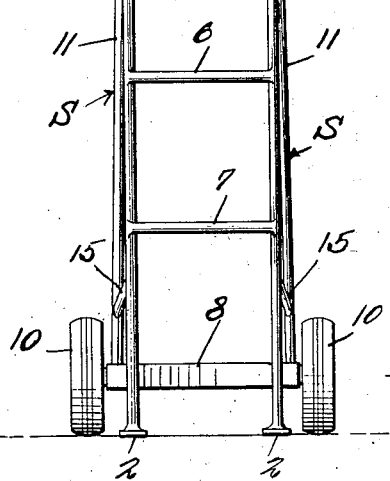
Fig. 2 is an elevation wherein the device is set upright and delineated in front view.

In carrying out the invention there is provided a frame, including a body B, which is U-shaped, the body including parallel side arms 1 provided at their forward ends with rectangularly disposed feet 2, which serve a double purpose, in that they prevent merchandise from sliding off the truck lengthwise, when the merchandise is in transit, and also aid in supporting the frame in an upright position, on its wheels, as shown in Fig. 2. The side arms 1 are connected by a rear cross bar 3. Near to the cross bar 3, the side arms 1 are supplied with depending, loop-shaped grips 4. The side arms 1 are joined together by a rear connection 5, an intermediate connection 6 and a forward connection 7, the connections being bowed downwardly, to accommodate barrels or other elongated objects.

An inverted, U-shaped bracket 8 is secured to the side arms 1 of the body B, adjacent to the feet 2, the bracket 8 extending outwardly beyond the arms 1, as shown in Fig. 2. An axle 9 is secured in the depending parts of the bracket 8, and wheels 10 are mounted to turn on the ends of the axle, outwardly of the side arms 1 and outwardly of the depending parts of the bracket 8.

Figure 1:
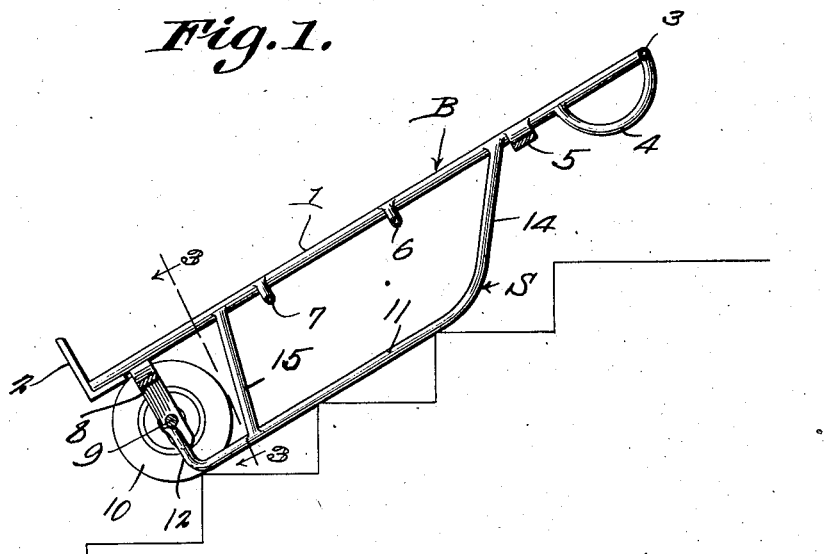
Fig. 1 shows, in side elevation, a device constructed in accordance with the invention, in the position which it will assume when merchandise is being transported downstairs or upstairs.
Figure 3:
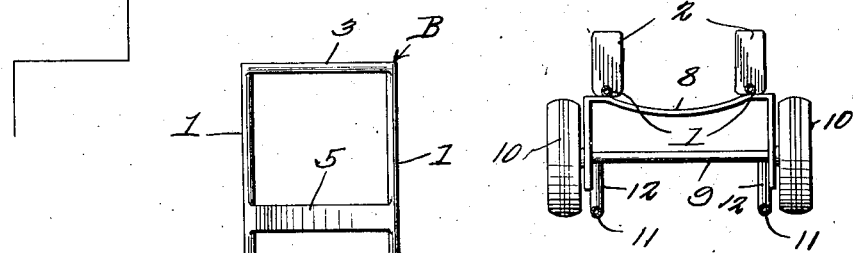
Fig. 3 is a cross section on the line 3—3 of Fig. 1.

Skids S are provided, and include runners 11 disposed below the side arms 1 of the body B. When the truck is viewed in side elevation, as in Fig. 1, the runners are parallel to the side arms 1, but the runners diverge slightly, as they extend forwardly, as Fig. 2 will make manifest. The runners 11 are provided at their forward ends with rectangularly disposed extensions 12, secured to the depending parts of the bracket 8 and to the axle 9, although, without any change in the showing of the drawing, the axle might be permitted to turn in the bracket 8. At their rear ends, the runners 11 are supplied with inclined extensions 14, having their upper ends joined to the side arms 1 of the body B, slightly in advance of the rear connection 5. Inwardly inclined posts 15 have their lower ends connected to the runners 11, adjacent to the forward extensions 12, the upper ends of the posts 15 being joined to the side arms 1 of the body B, a little in advance of the forward connection 7.

The lower portions of the wheels 10 are substantially flush with the lower edges of the runners 11, and the truck can be slid down a pair of stairs, or be drawn up a pair of stairs, on the runners 11, without causing the wheels 10 to bump. If the operator wishes, he can raise the rear end of the truck slightly from the position of Fig. 1, thereby enabling the wheels 10 to engage the tread of any step. In this way, the operator has at his control, a means whereby the downward sliding movement of the truck can be checked, at any step, and the operator is not called upon to exert a strong backward pull continuously, in order to prevent the laden truck from sliding downstairs with a run. On a level surface, the back end of the truck can be raised high enough so that the forward parts of the runners 11 will not drag on such a surface, the truck then being trundled along, like a barrow, on the wheels 10. Since the skids S diverge as they extend forwardly, they will be the more effective to prevent the truck from sliding downstairs too rapidly.

The mention of "stairs" of course does not preclude the use of the vehicle on a ramp, skid or other incline.

Having thus described the invention, what is claimed is:

1. A hand truck comprising a body having underlying, rigid, longitudinal runners, and a single pair of trundle-wheels carried by the body, the runners comprising straight portions, the forward ends of the straight portions terminating in a plane at right angles to the body and passing through the axis of rotation of the wheels—the lower edges of the straight portions being tangent to the lowermost portions of the wheels and approximately parallel to the body, and the straight portions being of such length as to engage the edges of more than two stairway steps at once, whereby the truck may be moved sled-wise up and down a pair of steps, with the wheels out of bumping contact with the steps: the aforesaid location of the forward ends of the straight portions, relatively to the wheels, bringing the wheels into operation on an even supporting surface, with a minimum amount of lifting at the rear end of the body.

2. A hand truck constructed as set forth in claim 1, and wherein the straight portions of the runners have a forward and lateral convergence, to give an increased braking effect when the truck is slid sled-wise downhill.

DELBERT JORGENSEN.